US010994576B2

(12) United States Patent
Mancinelli et al.

(10) Patent No.: US 10,994,576 B2
(45) Date of Patent: May 4, 2021

(54) ROTARY JOINT AND PRESSURE REGULATION SYSTEM FOR TIRES

(71) Applicant: Trelleborg Wheel Systems Italia S.p.A., Tivoli (IT)

(72) Inventors: Piero Mancinelli, Pescara (IT); Antero Sanguin, Marmorta (IT)

(73) Assignee: Trelleborg Wheel Systems Italia S.p.A., Tivoli (IT)

( * ) Notice: Subject to any disclaimer, the term of this patent is extended or adjusted under 35 U.S.C. 154(b) by 0 days.

(21) Appl. No.: 16/326,228

(22) PCT Filed: Jul. 26, 2018

(86) PCT No.: PCT/IT2018/050139
§ 371 (c)(1),
(2) Date: Feb. 18, 2019

(87) PCT Pub. No.: WO2019/021333
PCT Pub. Date: Jan. 31, 2019

(65) Prior Publication Data
US 2019/0210413 A1 Jul. 11, 2019

(30) Foreign Application Priority Data

Jul. 27, 2017 (IT) .......................... 102017000085893

(51) Int. Cl.
*B60C 23/00* (2006.01)
(52) U.S. Cl.
CPC ...... *B60C 23/00318* (2020.05); *B60C 23/003* (2013.01); *B60C 23/00309* (2020.05);
(Continued)
(58) Field of Classification Search
CPC ................ B60C 23/003; B60C 23/004; B60C 23/00309; B60C 23/00318; B60C 23/00347; B60C 23/00363
See application file for complete search history.

(56) References Cited

U.S. PATENT DOCUMENTS

| 4,019,552 A | 4/1977 | Tsuruta | |
|---|---|---|---|
| 4,844,138 A * | 7/1989 | Kokubu | ................ B60C 23/003 152/417 |

(Continued)

FOREIGN PATENT DOCUMENTS

| DE | 8715177 | 1/1988 |
|---|---|---|
| DE | 4010711 | 10/1991 |

(Continued)

OTHER PUBLICATIONS

International Search Report and the Written Opinion dated Nov. 14, 2018 From the International Searching Authority Re. Application No. PCT/IT2018/050139. (11 Pages).

(Continued)

*Primary Examiner* — Scott A Browne

(57) ABSTRACT

A rotary joint is configured to transfer a fluid between two entities, one of which is in rotary motion with respect to the other. The rotary joint comprises a cylindrical internal element, apt to be fixed to the entity in rotary motion, and a plurality of annular external elements. The external elements comprise at least two head elements, at least two housing elements of respective gaskets, two bearing elements, and at least one fluid inlet. The fluid inlet is placed between said two bearing elements. Housing elements of respective gaskets are arranged externally to the bearing elements, and head elements are arranged externally to the housing elements. The gaskets define an annular shaped sealed area. The sealed area is accessible on one side through said fluid inlet and on the other side through at least one fluid passage channel passing through the body of said internal element.

13 Claims, 7 Drawing Sheets

(52) U.S. Cl.
CPC .. *B60C 23/00347* (2020.05); *B60C 23/00363* (2020.05); *B60C 23/004* (2013.01)

(56) References Cited

U.S. PATENT DOCUMENTS

| | | | | |
|---|---|---|---|---|
| 6,857,457 | B2* | 2/2005 | Nienhaus | B60C 23/003 152/415 |
| 2005/0205182 | A1* | 9/2005 | Maquaire | B60C 23/003 152/417 |
| 2014/0062031 | A1* | 3/2014 | Honzek | B60C 23/003 277/551 |
| 2015/0068653 | A1* | 3/2015 | Cis | B60C 23/003 152/417 |
| 2015/0352911 | A1 | 12/2015 | Bittlingmaier | |

FOREIGN PATENT DOCUMENTS

| | | |
|---|---|---|
| EP | 3165382 | 5/2017 |
| WO | WO 2015/195028 | 12/2015 |
| WO | WO 2019/021333 | 1/2019 |

OTHER PUBLICATIONS

Rapporto di Ricerca e Opinione Scritta [Search Report and Written Opinion] dated Mar. 16, 2018 From the Ministero Dello Sviluppo Economico, Direzione Generale Sviluppo Produttivo e Competitivita, Ufficio Italiano Brevetti e Marchi Re. Application No. IT201700085893. (8 Pages).

* cited by examiner

ROTARY JOINT AND PRESSURE REGULATION SYSTEM FOR TIRES

RELATED APPLICATIONS

This application is a National Phase of PCT Patent Application No. PCT/IT2018/050139 having International filing date of Jul. 26, 2018, which claims the benefit of priority of Italian Patent Application No. 102017000085893 filed on Jul. 27, 2017. The contents of the above applications are all incorporated by reference as if fully set forth herein in their entirety.

FIELD AND BACKGROUND OF THE INVENTION

The present invention concerns a rotary joint and a pressure regulation system for tires.

The invention refers specifically to the field of tires for agricultural, earth- and forestry use, but can be considered in all applications that need to adjust the tire pressure, in particular to adapt the pressure according to use.

It is known that machines for agricultural use need to move on various types of soil. In particular, these machines can be used both on the road and on the field. Depending on the type of use there is a need to have a tire with different inflation pressures.

In fact, when the tractor works in field conditions, a low inflation pressure of tires allows a lower fuel consumption, resulting in an increase in traction, and moreover reduces the compaction of the soil. On the contrary, on the road it is necessary to increase the inflation pressure, to reduce fuel consumption and to improve the stability of the vehicle.

Traditionally, the problem of traction on the field can be partially solved by the aid of the ballast which, by increasing the weight, press the tire to the ground, increasing both the value of the contact pressure and the size of the footprint, with the effect of increase the amount of tire surface useful for traction. The increase in the size of the footprint can, however, also be achieved by reducing the internal pressure of the tire.

The use of low pressure on fields is however limited by the difficulty of bringing the tire back to a higher inflation pressure for the subsequent road travel. To limit the discussion there is therefore the difficulty to bring the tire pressure back to the correct value for road use, since this increase in pressure requires the use of systems outside the tire itself, which require the tractor to be stopped during operations.

The optimal working conditions on the road (where the pressure must be higher) and on the field (where the optimal pressure is lower) can be combined by means of a special pressure regulation system.

According to the prior art, to give rise to this variation of pressure there are various possibilities, which are however burdensome both from the point of view of the realization and from the economic point of view. Moreover, with none of the existing solutions it is possible to achieve the necessary pressure reduction without changing the geometry of the tire-rim assembly.

The U.S. Pat. Nos. 2,196,814, 2,525,752 and 5,109,905 relate to different systems to make multiple-chamber tires; U.S. Pat. No. 2,196,814 in particular describes a tire wherein the inner chamber is divided into compartments by a plurality of protrusions projecting inwardly from the wall of the tire, U.S. Pat. No. 2,525,752 describes a tire divided into several superimposed concentric annular chambers and U.S. Pat. No. 5,109,905 describes a tire divided into two overlapping concentric annular chambers, separated by a collapsing wall, one of the two chambers being inflated at a higher pressure, so as to compensate for any loss of pressure of the other. All the solutions according to these patents have the limit to add a constructive complication to the system in the phase of realization of the tire, and moreover limit the inner space with consequent decrease in the amount of air inside the cover.

Some existing solutions provide for the installation of equipment located in the space between the rim and the cover, and then inside the cover itself. Being the assembly of the tire on the rim achieved by the subsequent assembly of the two heels which will then hit the rim, it is extremely difficult to insert an external apparatus in a simple manner. In fact, the system should be mounted after the insertion of the first heel, thus limiting the maneuvering space to the assembly operator. Should, however, the system be mounted with ease, such as in the case of an additional air chamber (as described in U.S. Pat. No. 7,219,540), there would always be the problem of the limitation of air quantity inside the tire.

Moreover, occupying the space inside the cover means that, in the event of considerable inflection of the tire during operation or in the event of a puncture, the system will be damaged considerably.

U.S. Pat. No. 2,107,405 discloses a rotary joint applied to the wheel hub of a vehicle, through which a tire mounted on the wheel can be maintained properly inflated even while the vehicle is being driven. In particular, said rotary joint comprises two coaxial units, free to rotate with respect to each other and respectively a first unit in rotation together with the rim of the wheel and a second unit stationary with respect to the rim, said second unit comprising a cap applied in correspondence of the outer part of the hub, said first unit being in connection with the air chamber of said tire and said second unit being in connection with a source of pressurized air, arranged on the vehicle chassis, through a connecting pipe externally placed on the wheel. The solution described in U.S. Pat. No. 2,107,405 involves the presence of a pneumatic connecting tube mounted in the outer part of the circle, which constitutes an additional encumbrance disposed on the wheel and which, moreover, is exposed to shocks and interference due to external obstacles.

The German patent for utility model No. DE8907153 and U.S. Pat. No. 5,253,688 show pressure control systems in one tire wherein a tube connects the air chamber and the compression means that are integrated in the vehicle on which the wheel is mounted (in specific case a tractor) and not in tire cover. Systems of this type have the great difficulty consisting in the passage of air between the vehicle and the wheel system, which is rotating relative to the vehicle. This involves the use of complicated systems of gaskets and joints to ensure sealing. Moreover, this type of integrated system must necessarily be provided for a priori and can not be mounted on vehicles already on the market.

Last but not least, it should be considered the fact that pressure control should be viewed from an economic-environmental point of view, and therefore the considerable initial investment that some of the existing systems entail, which does not allow significant economic benefits and interesting investment return times should be considered.

In conclusion, taking into account in particular these last requirements, the system should, at least in some embodiments, be mounted on already existing rims without involving an excessive expense and without needing additional space with respect to the initial tire, already limited by regulations relating to road traffic.

SUMMARY OF THE INVENTION

In this context it is included the solution according to the present invention, which aims to ensure the possibility of adjusting the pressure of a tire, particularly a tire for tractors or agricultural machines in general, through a system which is inserted or can be inserted in the inner part of the wheel rims, and which can be adapted to be mounted on pre-existing wheels.

A purpose of the present invention is therefore to provide a rotary joint and a pressure regulation system for tires, in particular tires for agricultural use, land movement and forestry, which permit to overcome the limits of the pressure regulating systems according to the prior art and to obtain the technical results previously described.

Another aim of the invention is that said rotary joint and said pressure regulation system for tires can be realized with substantially limited costs, both in terms of production costs and in terms of operating costs.

Not the least purpose of the invention is to propose a rotary joint and a pressure regulation system for tires, in particular tires for agricultural, land and forest use that are simple, safe and reliable.

It is therefore a first specific object of the present invention a rotary joint apt to transfer a fluid between two entities, one of which is in rotary motion with respect to the other, said rotary joint comprising a cylindrical internal element, apt to be fixed to said entity in rotary motion, and a plurality of annular external elements, which can be coupled and which are self-centering, which can be fitted modularly, said external elements comprising at least two head elements, at least two housing elements of respective gaskets, two bearing elements and at least one fluid inlet element, said at least one fluid inlet element being placed in an intermediate position between said two bearing elements, said at least two housing elements of respective gaskets being arranged externally with respect to said two bearing elements and said at least two head elements being arranged externally with respect to said at least two housing elements of respective gaskets, said gaskets defining an annular shaped sealed area in the space delimited laterally by the same gaskets, internally by said internal element and externally by said external elements comprised between said gaskets, said sealed area being accessible on one side through said fluid inlet element and on the other side through at least one fluid passage channel passing through the body of said internal element up to one of the two axial ends.

In particular, according to a second preferred embodiment of the present invention, said rotary joint can comprise two fluid inlet elements placed in an intermediate position between said two bearing elements, and two housing elements of respective gaskets, spaced by a head element, said gaskets defining two separate sealed areas, one at each of said two fluid inlet elements, said internal element comprising two separate passage channels, respectively a passage channel for each of said two sealed areas.

Alternatively, according to a different preferred embodiment of the invention, said rotary joint can additionally comprise a housing element of a gasket located between each of said fluid inlet elements and a corresponding bearing element.

It is then a second specific object of the present invention to provide a pressure regulation system of a tire comprising a rotary joint as previously defined, in combination with a compressor installed on said non-rotating entity, and at least one interception valve for inlet and outlet flow from said tire, wherein a first passage channel of said rotary joint puts in fluid communication said compressor with operating means of said interception valve, through a valve, and a second passage channel of said rotary joint puts in fluid communication said compressor with said tire, through a valve and said interception valve.

Preferably, according to the invention, said valve along said first passage channel is a two-way valve and said valve along said second passage channel is a three-way valve.

Moreover an additional specific object of the present invention is a pressure regulation system of a tire comprising a rotary joint as previously defined, in combination with the hydraulic circuit of said non-rotating entity, a variable-volume chamber and control means of said chamber, apt to vary the volume of said chamber, said chamber being placed in the rim of said tire, being filled with air under pressure and being in fluid communication with said tire, through at least one interception valve; wherein a first passage channel of said rotary joint puts in fluid communication said hydraulic circuit with operating means of said interception valve, through a valve, and a second passage channel of said rotary joint puts in fluid communication said hydraulic circuit with said control means of said chamber, through a valve and said interception valve.

Preferably, according to the invention, said control means comprise three or more hydraulic cylinders, said valve along said first passage channel is a two-way valve and said valve along said second passage channel is a three-way valve.

It is an additional specific object of the present invention to provide a pressure regulation system of a tire which comprises a rotary joint as previously defined, in combination with the hydraulic circuit of said non-rotating entity, a reservoir, a compressor connected to a hydraulic motor, said reservoir, said compressor and said hydraulic motor being placed in the rim of said tire, said reservoir being filled with air under pressure and being in fluid communication with said tire, through said compressor and an interception valve; wherein a first passage channel of said rotary joint puts in fluid communication said hydraulic circuit with said hydraulic motor, in correspondence of operating means of said hydraulic motor in a first direction of rotation, and with operating means of said interception valve, through a valve, and a second passage channel of said rotary joint puts in fluid communication said hydraulic circuit with said hydraulic motor, in correspondence of operating means of said hydraulic motor in a second direction of rotation, opposite to said first direction of rotation, and with operating means of said interception valve, through the same valve or a different valve.

The efficacy of the rotary joint and pressure regulation system for tires of the present invention is evident, since it allows to provide for a solution that potentially can be adapted to the rims of existing tractors, without modification of structural architecture of axes and hubs. By means of the rotary joint and the pressure regulation system for tires according to the present invention, the user can go to the working field with the tire pressure optimized for road needs, when arrived to the field deflating the tires so to reach the value of pressure at which the traction on the field is maximized and, when the work is complete, bring the pressure back to the optimum value on the road. In this way, the tire will again reach the optimum pressure for road use, allowing the user to have the best operating conditions in both cases.

Another and more important feature is that the present invention allows to regulate with continuity the value of the pressure, on the basis of features of load, traction, slippage, floating, requests, and speed.

Moreover, the system allows a change of pressure with high efficiency and speed, better than any currently known technology.

BRIEF DESCRIPTION OF THE SEVERAL VIEWS OF THE DRAWINGS

The present invention will be described in the following, for illustrative, but not limitative, purposes according to some preferred embodiments, with particular reference to the figures of the enclosed drawings, wherein.

DESCRIPTION OF SPECIFIC EMBODIMENTS OF THE INVENTION

Figure 1:
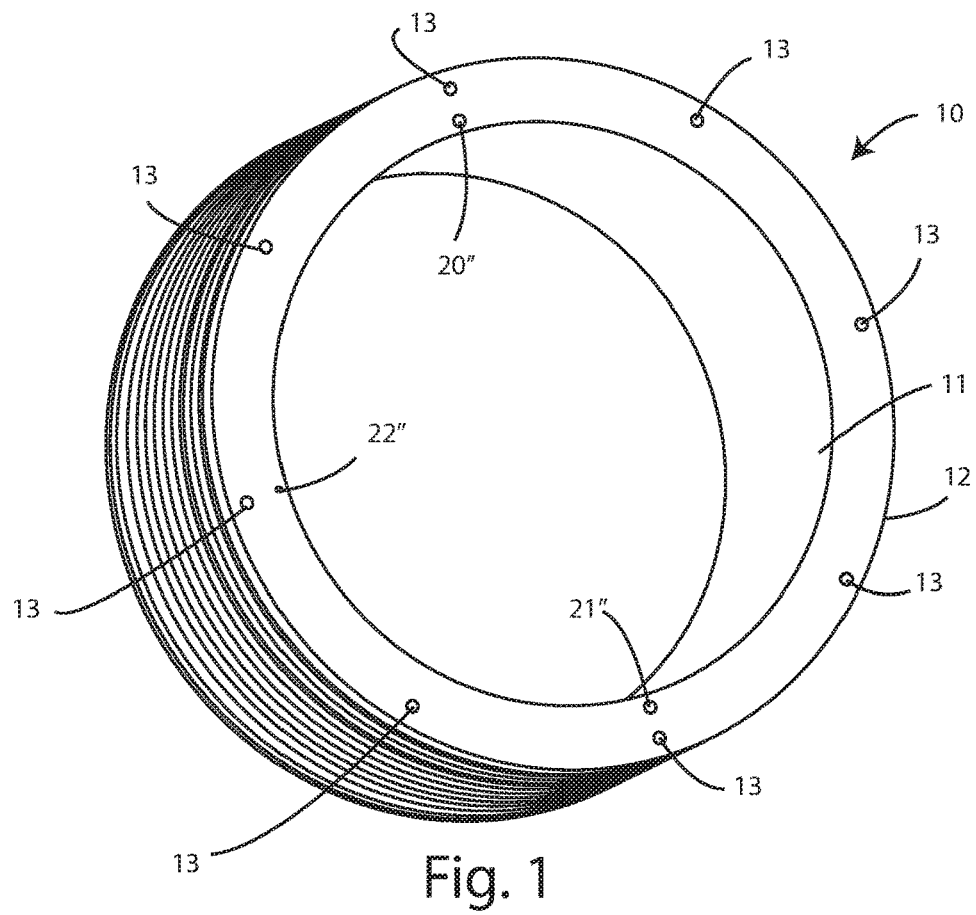
FIG. 1 shows a front perspective view of a rotary joint according to a first embodiment of the present invention.
Figure 2:
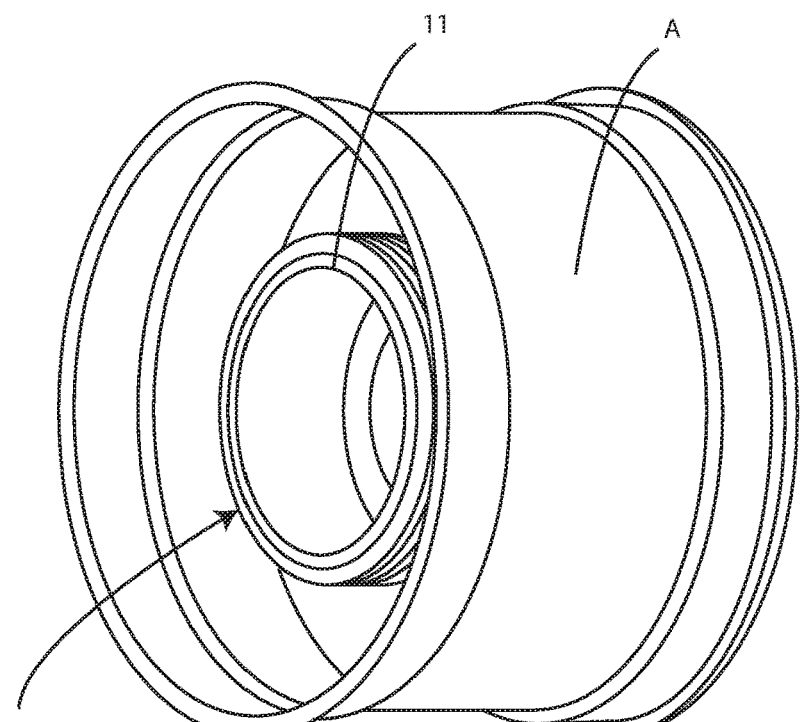
FIG. 2 shows a rear perspective view of the joint of FIG. 1 mounted on the inside of the rim of a wheel
Figure 3:
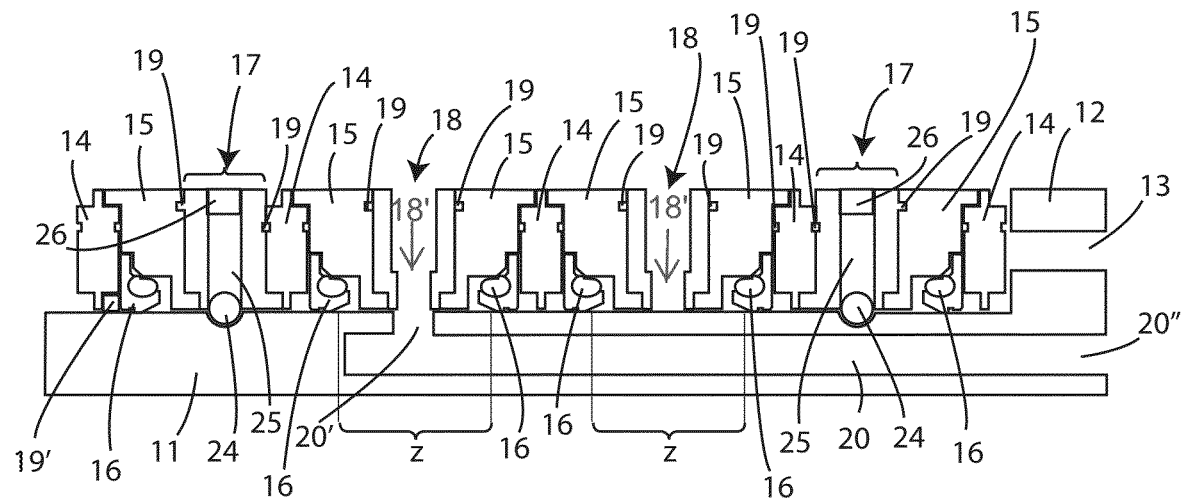
FIG. 3 shows a section view of a first section of the joint of FIG. 1.
Figure 4:
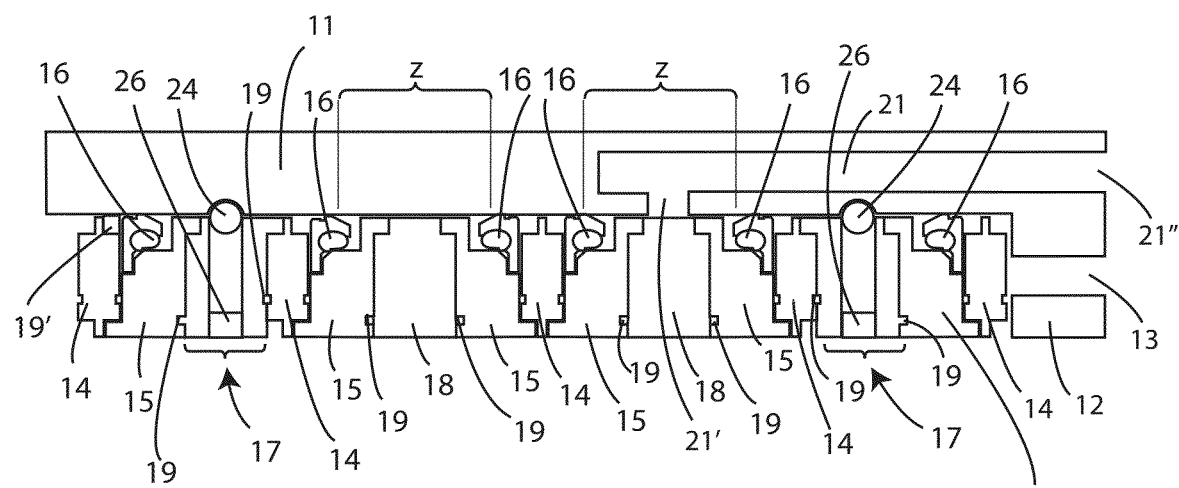
FIG. 4 shows a section view of a second section, opposite to said first section, of the joint of FIG. 1.
Figures 5A, 5B:
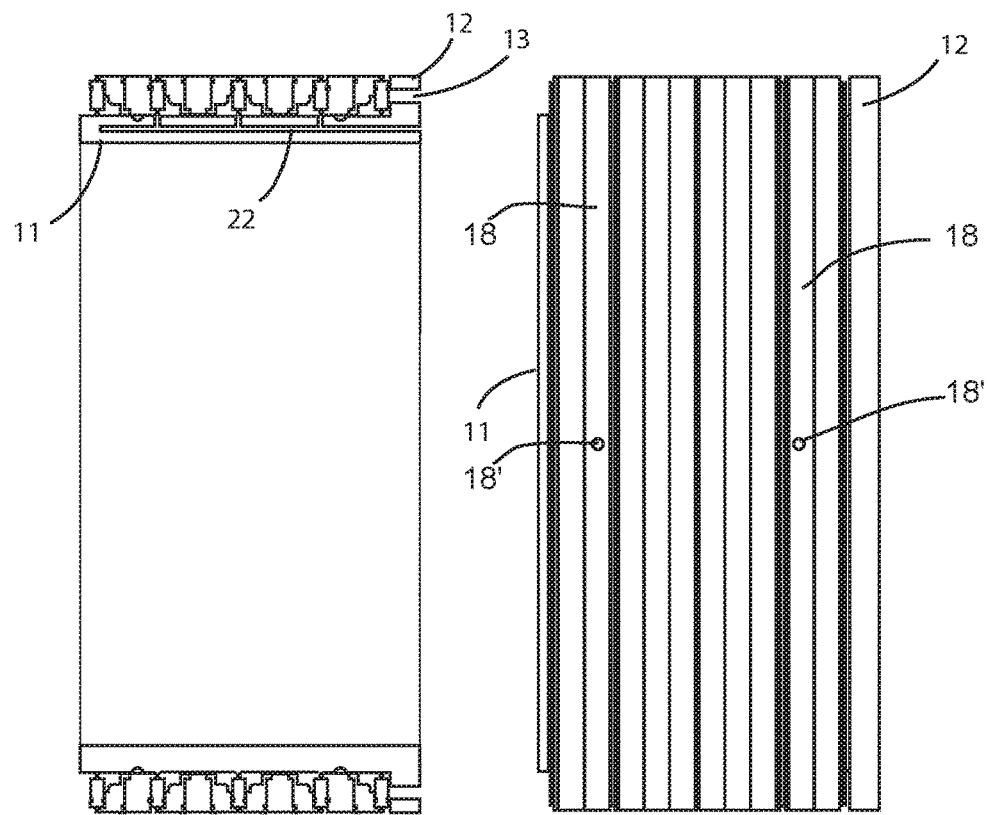
FIG. 5A shows a section view of the joint in an intermediate position between said first section and said second section.
FIG. 5B shows a lateral view of the joint of FIG. 1.

Making preliminarily reference to FIGS. 1-7, a rotary joint according to a first embodiment of the present invention, suitable for use with air as operating fluid, is indicated as a whole with the reference number 10 and is composed of five different elements, that are described herein below and that can be assembled according to the embodiment of FIG. 1 and in addition according to different configurations, shown in the following figures, in particular for the use of the joint with gaseous (in particular air) or liquid fluids (in particular oil), according to the embodiments that will be illustrated with reference to the following figures.

According to this first embodiment, the rotary joint 10 comprises an internal element 11, which has a cylindrical shape with a flange 12 on one end, provided with holes 13 and aimed at being coupled to a rim A of a wheel, and a plurality of mutually coupled external elements, all of which are annular and self-centering, these external elements being of four different types, in particular: five head elements 14, six housing elements 15 of respective gaskets 16 (shown only in FIG. 3, but also present in the remaining FIGS. 1-6), two bearing elements 17 and two fluid inlet elements 18 each having a fluid inlet 18', according to the arrangement shown in particular in FIGS. 3, 4, 5A and 5B. The space between the internal element 11 of the rotary joint 10 and the external elements is divided into annular shaped sealed areas Z, separated from each other by gaskets 16. The bearing elements 17 allow a possibility of rotation to the external elements located externally to them, while the external elements arranged between the two bearing elements 17 are fixed. In particular, the external elements that are more distant from the flange 12 and are arranged externally with respect to the first bearing element 17 are supported by a support bracket 29, integral with the wheel axle C (shown in FIG. 6). Among the different external elements, a plurality of rings 19 are present (shown only in FIGS. 3 and 4, but also present in the remaining FIGS. 1-7). Moreover, between the head element 14 farthest from the flange 12 of the internal element 11 and the gasket 16 housed by the housing element 15 farthest from the flange 12 is a dust seal ring 19'.

The internal element 11 is crossed by three channels 20, 21, 22, respectively a first channel 20 for passage of an operating fluid of an interception valve 23, whose characteristics and operation will be explained in the following; a second channel 21 for the passage of compressed air coming from an air compressor (not shown) mounted on the chassis of the vehicle and directed to the tire B; and a third channel 22 for lubrication purposes.

Figure 6:
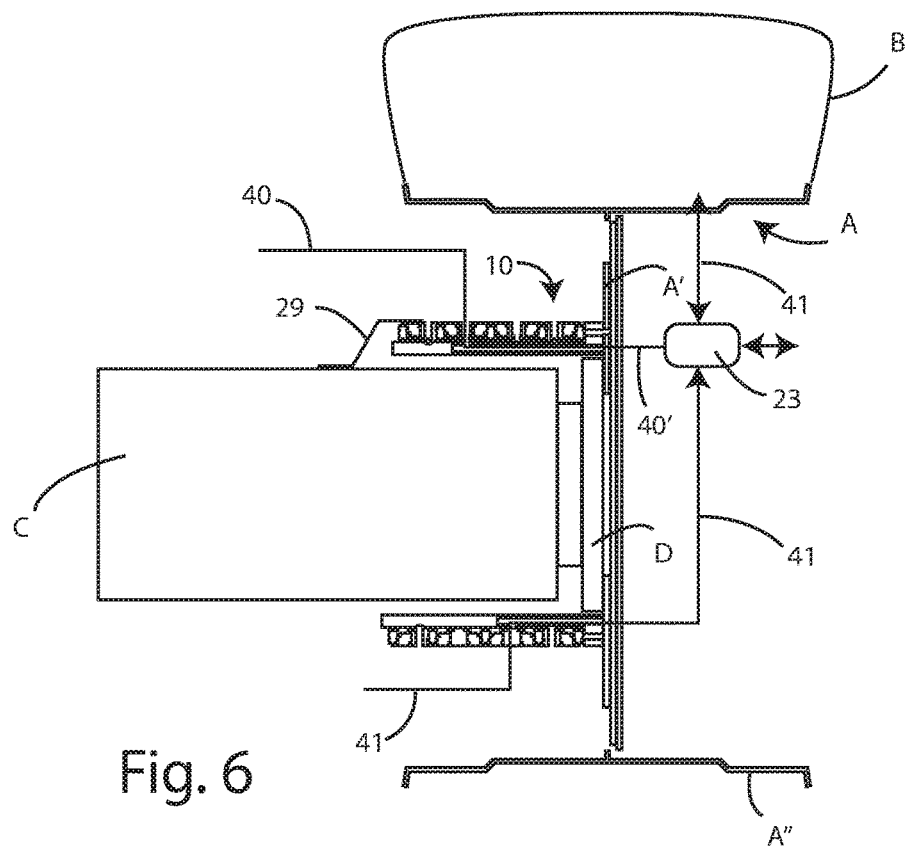
FIG. 6 shows a schematic section view of the joint of FIG. 1 and of a wheel on which said joint is mounted and of the circuit of air under pressure for inflation of the tire.

Said first channel 20 has two openings 20' and 20", respectively a first opening 20' formed in the area below a first fluid inlet element 18, which in turn is connected, via the line 40, to the control means of said operating fluid, which controls the actuation of said interception valve 23, and a second opening 20", in pneumatic connection with said valve 23, via the line 40', as shown schematically in FIG. 6.

Said second channel 21 has two openings 21' and 21", respectively a first opening 21' formed in the area below a second fluid inlet element 18, which in turn is pneumatically connected, via the line 41, with said air compressor (not shown) mounted on the vehicle chassis, and a second opening 21", in pneumatic connection with said tire B, by means of a line 41' along which said interception valve 23 is disposed, as shown schematically in FIG. 6.

Said bearing element 17 allows putting from six to twelve rolling elements 24 through respective radial holes 25 provided in the body of the bearing element 17, said holes 25 being threaded in the outer part for the assembly of a grub screw 26 to retain the rolling elements 24. This solution guarantees the efficiency of rolling with considerably lower costs compared to the assembly of a commercial bearing of the same size (of the order of 500 mm for a tractor).

Figure 7:
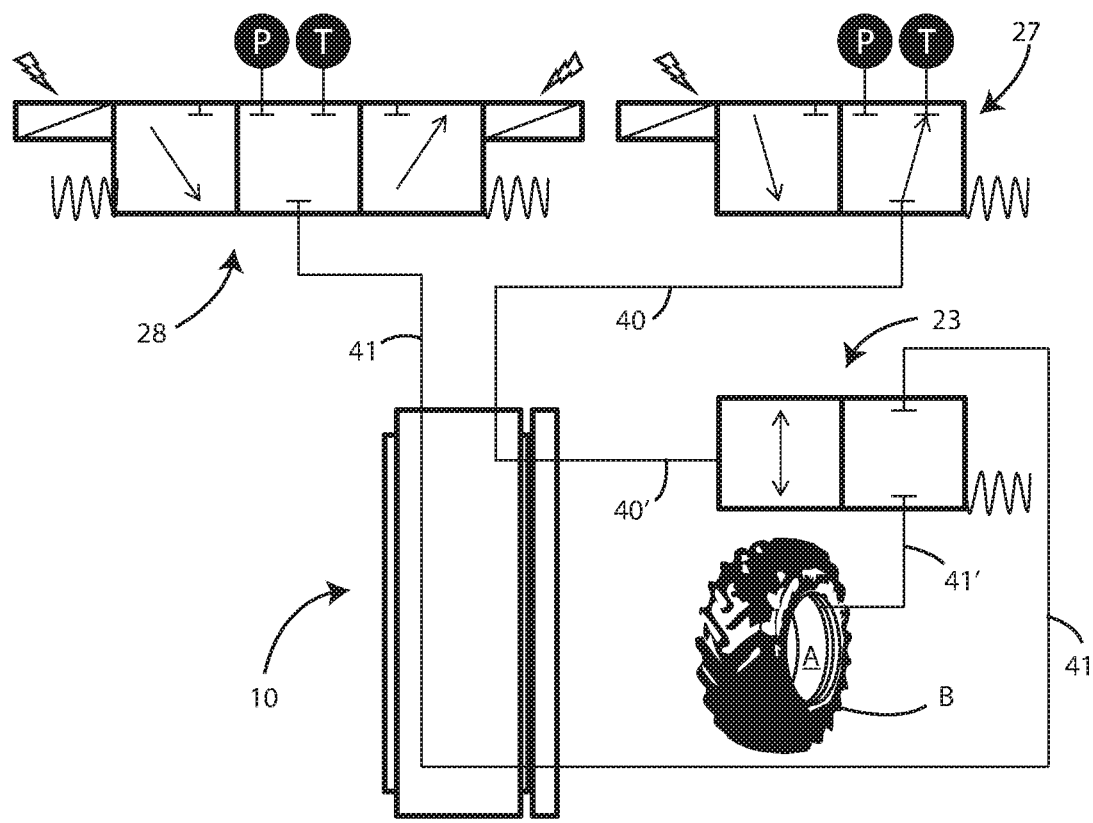
FIG. 7 shows a hydraulic scheme of the pressure regulation system for tires of the present invention in an embodiment suitable for use with the rotary joint of FIG. 1.

As previously stated, the embodiment of the rotary joint according to the present invention shown in FIGS. 1-7 is functional to implement a pressure regulation system for tires which makes use of the compressor generally mounted on tractors for pneumatic braking of the trailer, but it is also suitable for use with a dedicated compressor, specially mounted on the vehicle structure. Referring specifically to FIG. 7, a two-way electrovalve 27 and a three-way electrovalve 28, both for air passage, must also be fitted for adjusting the tire pressure on the machine. When the two-way electrovalve 27 is open, it moves the interception valve 23, positioned on the rim A, to an open position; at this point the 3-way electrovalve 28 allows the passage of pressurized air coming from the compressor, through the joint 10, via the lines 41 and 41', providing inflating (drawer all in one direction on P) or deflating (drawer in the other direction on T) of tire B.

The rotary joint 10 in the embodiment of the present invention described with reference to FIGS. 1-7, assembled in the two-channel configuration for the passage of air, a channel being used in cooperation with a line 40, 40', to drive a drawer of the interception valve 23 housed in the rim A, the other, in cooperation with line 41, 41', for the passage of air, under pressure or exhaust according to the position of the drawer of the three-way valve 28 on the machine, ensures maximum safety even in case of malfunction of the inflation system, unlike than according to the joints of the prior art, of the type described above with reference to U.S. Pat. No. 2,107,405. Moreover, again with respect to this type of known solution, in the embodiment of the present invention described with reference to FIGS. 1-7, both the bearings and gaskets are lubricated by an external circuit, ensuring greater reliability.

Furthermore, in the embodiment of the present invention described with reference to FIGS. 1-7, the rim A and the rotary joint 10 are integral, so that, once assembled, the rotary joint 10 follows the wheel in all the operations of assembly, maintenance, adjustment, without requiring the disassembly of the support brackets. In particular, the rim A, with the tire B regularly fitted, can normally be mounted on the flange of hub D, which passes through the rotary joint 10.

Because of its relative simplicity, the embodiment of the present invention described with reference to FIGS. 1-7 responds to the demand for economy and adaptability to each tractor configuration.

According to a different embodiment of the rotary joint of the present invention, described with reference to FIGS. 8A-8B and indicated by the reference number 10', the same annular elements constituting the rotary joint 10 according to the embodiment of the present invention described with reference to FIGS. 1-7, differently combined, constitute a rotary joint 10', suitable for use with oil as an operating fluid. Moreover, in addition to the embodiment of FIGS. 8A-8B, wherein the rotary joint 10' is provided with two oil passage channels, the same elements can be combined to form rotary joints with any number of channels. In the following figures, to indicate the elements of the rotary joint and of the pressure regulation system which remain identical to those already described with reference to FIGS. 1-7, the same reference numbers will be used. Moreover, for the description of the same, reference will be made to the part of the description relating to the previous embodiment. It follows evidently that, apart from a different arrangement of the external elements, also in a smaller number with respect to the embodiment of FIGS. 1-7, the internal element 11' presents the difference of being shorter, with the first openings 20', 21' of the channels 20, 21 being closer to each other. Said passage channels 20, 21, as well as the corresponding fluid inlets 18' are crossed by oil, which in addition to the actuation function, also performs a lubrication function, reason why it is not necessary to also provide for the presence of a special passage channel of lubricating oil.

In particular, the oil under pressure required as the operating fluid, according to the characteristics that will be described below, can be supplied by the hydraulic circuit of the tractor, which has been present on tractors as standard equipment since the '50s.

The pressure regulation systems of tires that can be implemented in combination with a joint of the type operating with oil are hybrid, ie they consist of two parts: a first hydraulic part, comprising the lines 40 and 41 (as shown in FIGS. 9-12), for the oil passage, and a second part for the conversion of hydraulic energy (taken from the tractor) into pneumatic energy, the one that implements the inflation system.

The technical reason for the choice of a rotary joint 10 using oil consists in the need to transfer a high power to the rotating part of the tractor, ie to the wheel, to allow quick variations in pneumatic pressure. The reason of the greater usable power lies in the fact that the pressure differential for pneumatic systems (ie operating with air) is at most 7 bar, while it is about 190 bar in hydraulic systems, therefore 27 times higher. Since the flow rate is proportional to the pressure and the hydraulic power is equal to the product of the pressure for the flow rate, the transfer of power to the wheel is much faster with a hydraulic system.

Figures 8A, 8B:
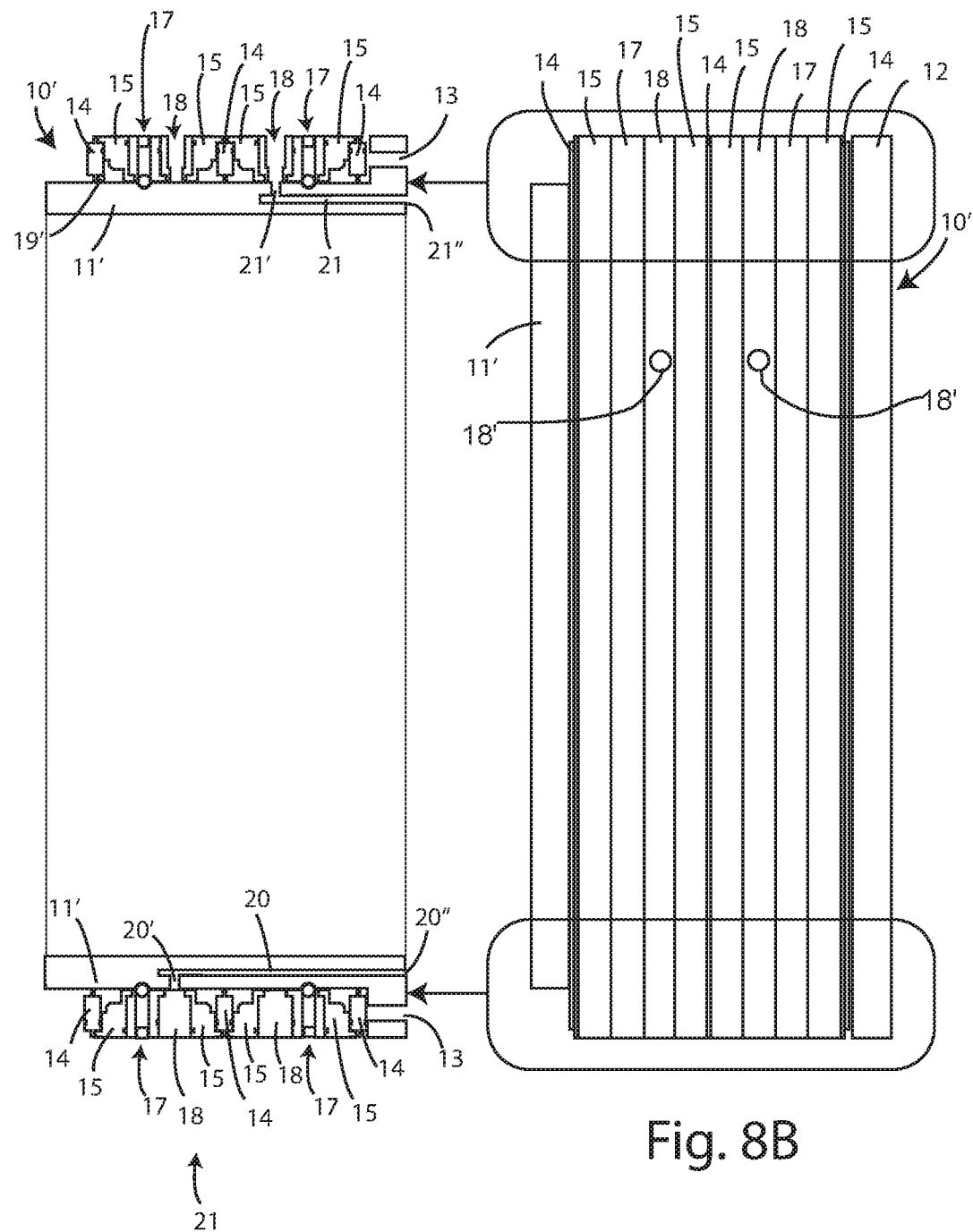
FIG. 8A shows a section view of a rotary joint according to a second embodiment of the present invention.
FIG. 8B shows a side view of the rotary joint of FIG. 8A.

Moreover, while typically pneumatic-type systems can rely on actual fluid-dynamic powers of the order of kW, the hydraulic rotary joint 10' according to the embodiment of the present invention shown with reference to FIGS. 8A-8B can transfer all the hydraulic power installed on a tractor that, for example, for modem machines is at least 25% of the installed power, ie if the diesel power is 200 kW, the hydraulic rotary joint 10' can, without considering yields, make available at the wheel up to 50 kW. It follows that, for the pressure regulation system for tires using the oil rotary joint 10', in the variable chamber configuration as will be described hereinafter with reference to FIGS. 9 and 10, in order to obtain a variation of the tire pressure from the minimum value of 1 bar up to 1.6 bar, about 2-3 s is sufficient for a single wheel, while for systems of the known type operating with air the same regulation requires several minutes.

The oil rotary joint according to the embodiment shown with reference to FIGS. 8A-8B can be used to realize pressure regulation systems of tires of different types, which will be shown with reference to the following figures. As already said previously, all these control systems are of hybrid type, ie are comprised of a first hydraulic part, for the passage of oil, and a second part for the conversion of hydraulic energy into pneumatic one, the latter directly operating the inflation of the tire.

Figure 9:
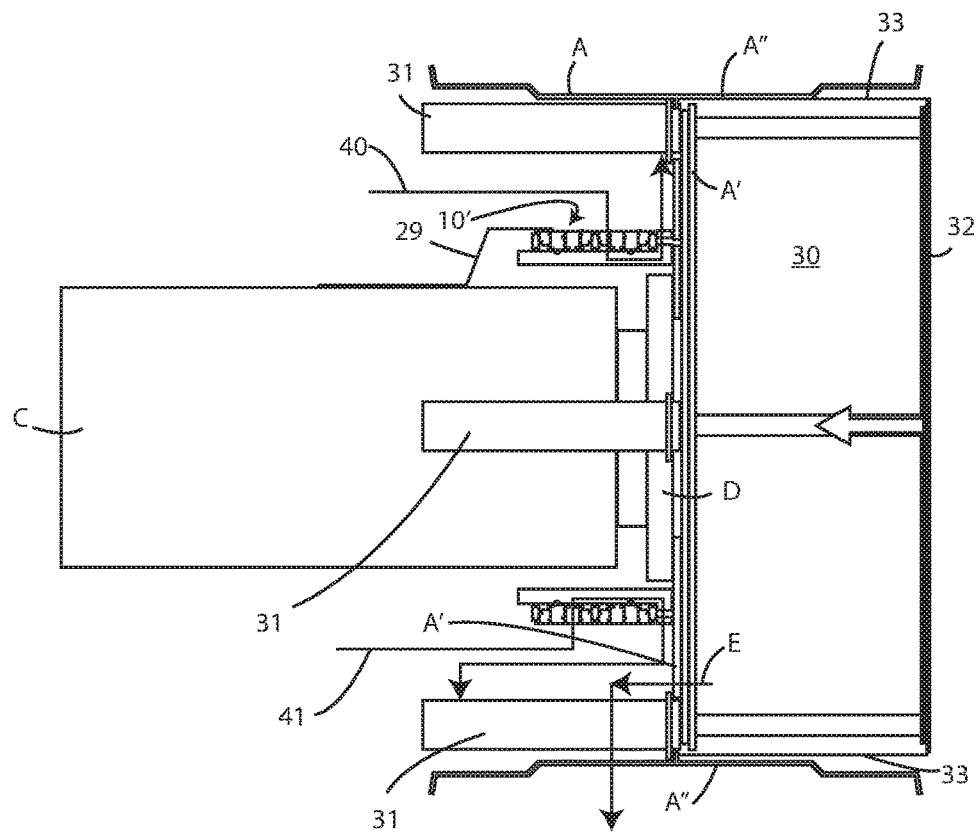
FIG. 9 shows a schematic section view of the joint of FIGS. 8A and 8B, of a wheel on which said joint is mounted and of a first kind of hybrid circuit, with a hydraulic part and a pneumatic part, for the inflation of the tire.
Figure 10:
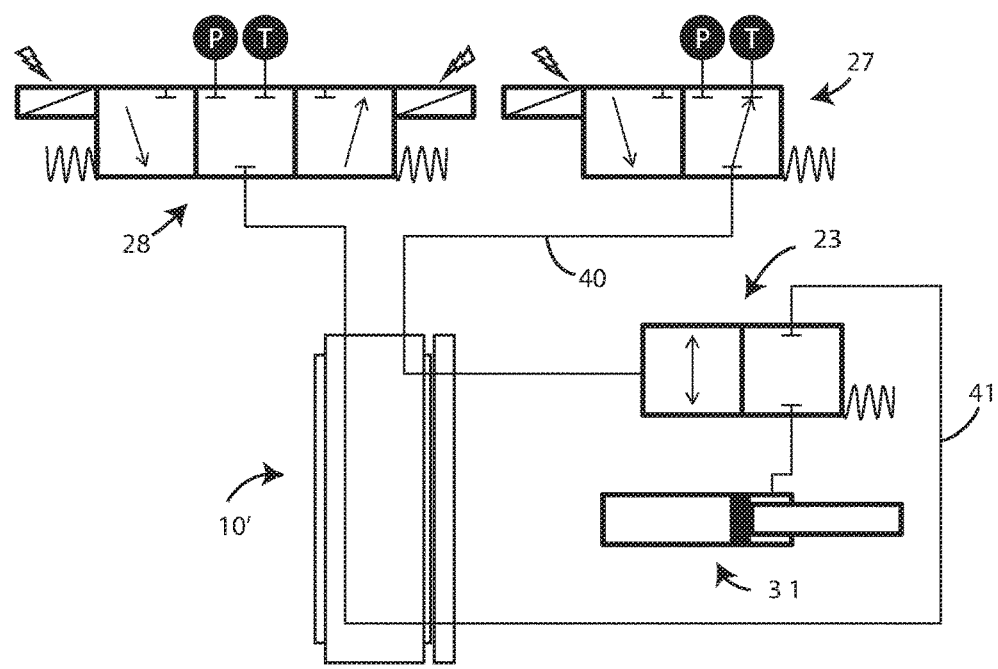
FIG. 10 shows a hydraulic scheme of the pressure regulation system for tires of the present invention in a suitable embodiment of FIG. 9.

Referring to FIGS. 9 and 10, a first embodiment of the pressure regulation system for tires according to the present invention suitable for using the rotary joint according to the embodiment of the present invention shown with reference to FIGS. 8A-8B, includes a variable chamber 30 operated by three or more hydraulic cylinders 31, arranged on the rim A.

Referring to FIG. 9, the variable chamber 30 contains pressurized air and is integrated into the rim A, occupying the cylindrical volume comprised between the disc A' of the rim A, a disc shaped piston 32, and laterally partially the channel A" of the rim A, for the fixed part and partially a sleeve 33 of rubberized canvas for the mobile part, so as to ensure airtightness. The disc shaped piston 32 is actuated by said hydraulic cylinders 31, which control its approach to the disc A' of the rim A or the removal from it. The variable chamber 30 is in direct connection (line E) with the tire B of the vehicle, through holes made in the external part of the channel A" of the rim A, so that a variation of the volume of the variable chamber 30 results in a variation of air pressure in both the variable chamber 30 and inside the tire B, by virtue of the connection between the two compartments. The hydraulic cylinders 31 are in hydraulic connection, through the rotary joint 10', via the lines 40 and 41, with the hydraulic circuit of the tractor.

In particular, with reference to FIG. 10, the pressure regulation system for tires according to the embodiment shown with reference to FIG. 9 is actuated through two electrovalves 27, 28, arranged on the machine side, respectively a two-way electrovalve 27 and a three-way electrovalve 28, as well as an interception valve 23 mounted on the rim A. When the two-way electrovalve 27 is open, it moves the interception valve 23 positioned on the rim A to an open position; at this point the three-way electrovalve 28 supplies, via the rotary joint 10' and the line 40', the hydraulic cylinders 31 arranged on the rim A, which compress the piston 32 of the variable chamber 30, reducing its volume and therefore increasing the pressure of the air (drawer all in one direction on P). The reduction in pressure is obtained by discharging the oil contained in the hydraulic cylinders 31 via the line 41, which flows due to the thrust of the air on the piston 32 of the variable chamber 30, which thus expands (drawer in the other direction on T).

The operating advantages of the pressure regulation system for tires according to FIGS. 9 and 10, with respect to the rotary joints of the prior art of the same type as those described with reference to the U.S. Pat. No. 2,107,405, DE8907153 and U.S. Pat. No. 5,253,688, are firstly the extremely reduced inflation and deflation times, in the order of seconds to pass from 1 to 1.6 bar according to the embodiment of the invention, against a few minutes required by the solutions of the prior art.

The implementation of tire pressure in such a fast way allows to have a real time control of the same, depending on the occurrence of events that determine the need for correction, such as a sudden increase in vertical load, due to the lifting of a heavy tool, or a sudden load transfer due to the tilting torque on the rear axle, to which the adjustment system of the present invention provides an immediate response in the increase of tire pressure; or vice versa a loss of traction due to the deterioration of the adhesion conditions, to which the regulation system of the present invention provides an immediate response in the reduction of pressure with consequent increase in the area of contact between soil and recovery of traction. Consequently, the wheel, understood as a set of tire B, variable chamber 30 and rim A, adapts dynamically to the events encountered during its operation.

Moreover, there is no exchange of air between the environment, typically contaminated by dust and humidity and the variable chamber 30/tire B assembly, for which dehumidifier filters and maintenance operations on the compressor/cylinders in general are not required, as is necessary for solutions of the same type as those described in U.S. Pat. No. 2,107,405, DE8907153 and U.S. Pat. No. 5,253,688.

Furthermore, the pressure regulation system for tires according to FIGS. 9 and 10 does not require the assembly of a dedicated compressor such as the pressure regulation systems of tires of the prior art of the same type as those described in the U.S. Pat. No. 2,107,405, DE8907153 and U.S. Pat. No. 5,253,688.

The rotary joint 10' described with reference to FIGS. 8A, 8B, 9 and 10 is assembled in the two-channel configuration for the passage of oil, wherein a channel is used, in cooperation with line 40, to drive a drawer of the interception valve housed in the rim A and the other channel is used, in cooperation with line 41, for the passage of oil feeding three or more hydraulic cylinders 31 for the movement of the piston 32 of the variable chamber 30, under pressure or with discharge according to the position of the three-way valve 28 on the machine, this configuration ensuring the maximum safety even in the event of malfunction of the inflation system.

A further advantage is due to the fact that both the bearings 17 and the gaskets 16 are continuously lubricated by the same oil used to operate the hydraulic cylinders 31, always guaranteeing high reliability.

Finally, as for the embodiment described above with reference to FIGS. 1-7, also in this case the rim A and the rotary joint 10' are integral, and therefore, once assembled, the rotary joint 10' follows the wheel in all assembly, maintenance and adjustment operations, without requiring the disassembly of the support brackets 29.

Figure 11:
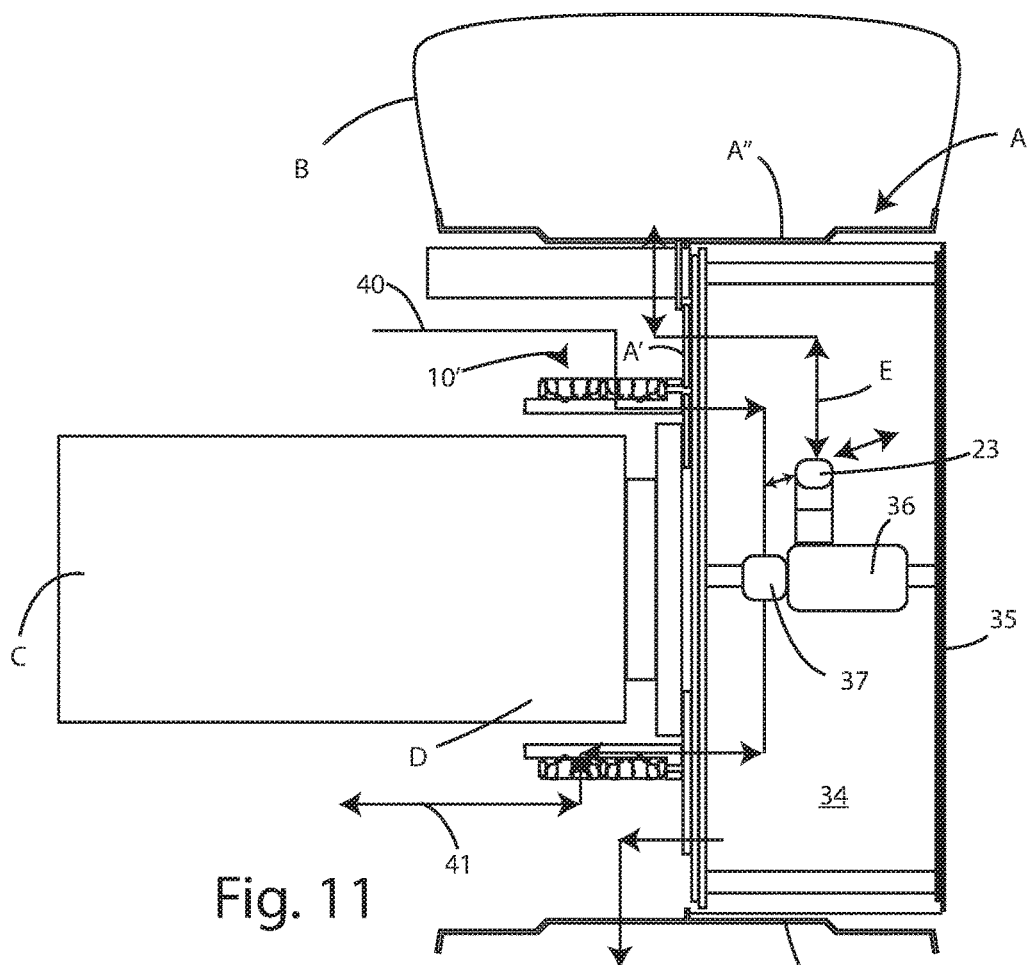
FIG. 11 shows a schematic section view of the joint of the FIGS. 8A and 8B, of a wheel on which said joint is mounted and of a second type of hybrid circuit, with a hydraulic part and a pneumatic part, for the inflation of the tire.
Figure 12:
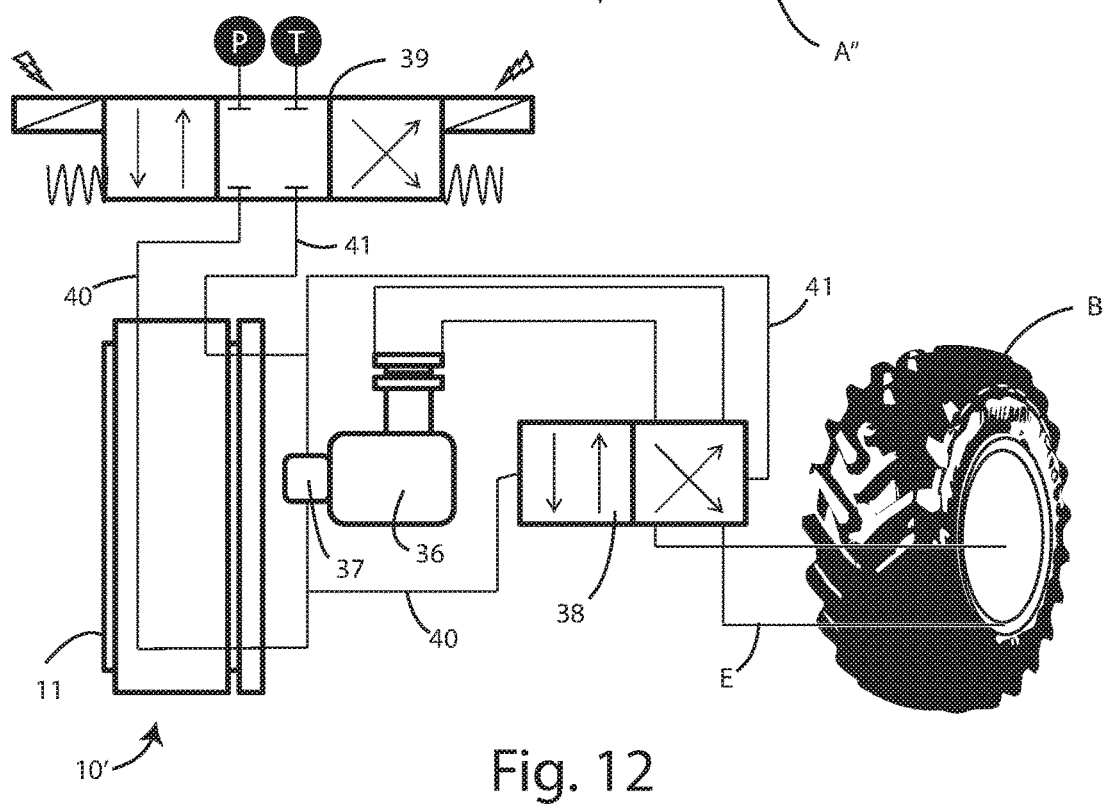
FIG. 12 shows a hydraulic scheme of the pressure regulation system for tires of the present invention in a suitable embodiment of FIG. 11.

Referring to FIGS. 11 and 12, i a second embodiment of the pressure regulation system for tires is shown according to the present invention suitable for using the rotary joint 10' according to the embodiment of the present invention shown with reference to FIGS. 8A-8B, wherein the outer compartment of the rim A is used as a reservoir 34 for pressurized air, said reservoir 34 being delimited by the disc A' of the rim A, by the channel A" of the rim A, and by a circular cover 35 which, screwed air-tightly, constitutes the second cylindrical base of the reservoir 34 in the outer compartment of the rim A. The fixed chamber reservoir 34 communicates directly with the tire B through a compressor 36; by actuating the latter, in one direction of rotation or in the other, air moves from one compartment to the other and consequently the pressure of the tire is changed. Inside the reservoir 34 a hydraulic motor 37 is housed, on which the compressor 36 is placed. Two electrovalves 38 and 39 are installed on the machine, respectively a two-way electrovalve 38 and a three-way electrovalve 39. When the two-way electrovalve 38 is open, it operates the interception valve 23, positioned on the rim A, in the open position; at this point the three-way electrovalve 39 supplies, through the rotary joint 10', the hydraulic motor 37. In this phase, the compressor 36 draws air from the reservoir 34 and compresses it, through the line E, into the tire B, thus increasing the air pressure in it.

The pressure reduction is obtained with the two-way electrovalve 38 and the three-way electrovalve 39 with the drawer in the opposite position to that of inflation, therefore the hydraulic motor 37, turning in the opposite direction, sucks air from the tire B and compresses it in the reservoir 33.

The hydraulic energy required to vary the volume of the chamber is provided by the rotary joint 10', with two or more annular channels, which carries hydraulic oil under pressure coming from the hydraulic circuit of the tractor, via the lines 40, 41. The system thus constituted is a hybrid hydro-pneumatic system, the assembly of hydraulic motor 37 and compressor 36 implements the conversion between hydraulic energy and pneumatic energy.

The system thus conceived guarantees reasonably fast pressure regulation times to allow the pressure to be adapted to occurring events such as changes in wheel load, slip, speed variation. In response to each of these events, according to a logic stored in a control unit on board the machine, the tire pressure will be adjusted in real time to the most convenient value for the energy saving of the vehicle, to guarantee tire integrity, driving safety and other settings not the object of the present invention.

The hydraulic rotary joint 10' has an annular shape, to ensure the passage inside of it of the wheel hub D of the tractor, it is coaxial to the wheel axle C, and is mounted in the inner part of the rim A.

The operating advantages of the pressure regulation system for tires according to FIGS. 9 and 10, with respect to the rotary joints of the prior art of the same type as those described with reference to the U.S. Pat. No. 2,107,405, DE8907153 and U.S. Pat. No. 5,253,688, are firstly the extremely reduced inflation and deflation times, thanks to a dedicated compressor 36 for each wheel, to the high hydraulic power available and to the fact that during pressure regulation the compressor 36 sucks at a pressure higher than the ambient pressure, therefore it must compensate for a lower pressure differential.

Moreover, the quick implementation of the tire pressure allows to have a control of the same depending on the occurrence of events that determine the need for correction: a sudden increase in vertical load due to the lifting of a heavy tool, a sudden transfer of load due to the tilting torque on the rear axle causes an immediate response in the increase of the pressure of the tire, vice versa the loss of traction due to the deterioration of the conditions of adhesion has an immediate confirmation in the reduction of the pressure with consequent increase of the contact area between the tire and soil and the recovery of traction.

In addition, there is no exchange of air between the environment, typically contaminated by dust and moisture, and the reservoir 34/tire B assembly, whereby dehumidifying filters and maintenance operations on the compressor 36 in general are not required.

Also in this case, the rotary joint 10' is assembled in the two-channel configuration for oil passage shown with reference to FIGS. 8A-8B, while a channel is used in cooperation with a line 40 to drive a drawer of the interception valve 23 housed in the rim A, and the other channel is used in cooperation with a line 41 for the passage of oil that feeds the group formed by the hydraulic motor 37 and the compressor 36, performing the inflation or deflation according to the position of the tray of the three-way valve 39 on the machine, this configuration ensuring maximum safety also in case of malfunction of the inflation system.

Moreover, both the bearings 17 and the gaskets 16 of the rotary joint 10' are lubricated ensuring a high level of reliability, and the rim A and the rotary joint 10' are integral, so that, once assembled, the rotary joint 10' follows the wheel in all assembly, maintenance and adjustment operations, without requiring the disassembly of the support brackets 29.

The present invention has been described for illustration purposes, but not for limitation purposes, according to its preferred embodiments, but it is to be understood that variations and/or modifications may be made by those skilled in the art without departing from the relative scope of protection, as defined from the attached claims.

What is claimed is:

1. A rotary joint configured to transfer a fluid between two entities, the two entities comprising a non-rotating entity and an entity that is in rotary motion with respect to the other, said rotary joint comprising:
    a cylindrical internal element, configured to be fixed to one of said two entities;
    and a plurality of annular external elements, which are coupled to each other and which are self-centering, which is fitted modularly, said plurality of annular external elements comprising at least two head elements, at least two housing elements of respective gaskets, two bearing elements and at least one fluid inlet element provided with at least one fluid inlet, said at least one fluid inlet element being placed in an intermediate position between said two bearing elements, said at least two housing elements of respective gaskets being arranged laterally inward with respect to said two bearing elements and said at least two head elements being arranged laterally outward with respect to said at least two housing elements of respective gaskets;
    wherein at least one annular shaped sealed area is defined in a space delimited laterally by the gaskets, internally by said internal element and externally by one of:
    (a) the at least one fluid inlet element and the housing elements, or
    (b) one or more additional external elements from the plurality of annular of external elements which are between said gaskets,
    wherein said annular shaped sealed area being accessible on one side through said fluid inlet and on the other side through at least one fluid passage channel passing through a body of said internal element.

2. The rotary joint according to claim 1, comprising two fluid inlet elements provided with respective fluid inlets, said fluid inlet elements being placed in an intermediate position between said two bearing elements, and said two housing elements, spaced by a third head element from the at least two head elements;
    wherein said respective gaskets defining the at least one annular shaped sealed area correspond with one of the fluid inlet elements,
    wherein additional housing elements of respective gaskets of the at least two housing elements correspond with the other of the fluid inlet elements which further corresponds with a second of the at least one annular shaped sealed areas, and
    wherein said at least one fluid passage channel comprises a plurality of fluid passage channels, each of the channels corresponding with a respective sealed area to the extent that one sealed area corresponds with one channel and another sealed area corresponds with another fluid channel.

3. The rotary joint according to claim 2, further comprising at least two additional gasket housing elements, each additional gasket housing element located laterally outward of said two bearing elements.

4. A pressure regulation system of a tire comprising a rotary joint as defined in claim 2, in combination with a compressor installed on said non-rotating entity, and at least one interception valve for inlet and outlet flow from said tire, wherein the plurality of fluid passage channels comprises a first passage channel and a second passage channel, wherein the first passage channel of said rotary joint puts in fluid communication said compressor with a first line that is a fluid source line of said interception valve, through a first passage channel valve, and wherein the second passage channel of said rotary joint puts in fluid communication said compressor with said tire, via a second line, through a second passage channel valve and said interception valve.

5. The pressure regulation system of a tire according to claim 4, wherein said valve along said first passage channel is a two-way valve and said valve along said second passage channel is a three-way valve.

6. A pressure regulation system of a tire comprising a rotary joint as defined in claim 2, in combination with a hydraulic circuit of said non-rotating entity, a variable-volume chamber and control means of said chamber, apt to vary the volume of said chamber, said chamber being placed in a rim of said tire, being filled with air under pressure and being in fluid communication with said tire, through at least one interception valve; wherein the at least one fluid passage channel comprises a first passage channel and a second passage channel, wherein the first passage channel of said rotary joint puts in fluid communication said hydraulic circuit with a fluid source line of said interception valve, via a first passage channel valve, and the second passage channel of said rotary joint puts in fluid communication said hydraulic circuit with said control means of said chamber, via a second line, through a second passage channel valve and said interception valve.

7. The pressure regulation system of a tire according to claim 6, wherein said control means comprise three or more hydraulic cylinders, said valve along said first passage channel is a two-way valve and said valve along said second passage channel is a three-way valve.

8. A pressure regulation system of a tire comprising a rotary joint as defined in claim 2, in combination with a hydraulic circuit of said non-rotating entity, a reservoir, a compressor connected to a hydraulic motor, said reservoir, said compressor and said hydraulic motor being placed in a rim of said tire, said reservoir being filled with air under pressure and being in fluid communication with said tire, through said compressor and an interception valve;

wherein the at least one fluid passage channel comprises a first passage channel and a second passage channel;

wherein the first passage channel of said rotary joint puts in fluid communication, via a first line, said hydraulic circuit with said hydraulic motor, and with a fluid source line of said interception valve, through a first passage channel valve, whereby operation of the hydraulic motor in a first direction of rotation causes transfer of compressed air from the reservoir to the tire;

and the second passage channel of said rotary joint puts in fluid communication, via a second line, said hydraulic circuit with said hydraulic motor, and with a fluid source line of said interception valve, through the first passage channel valve or a second passage channel valve, whereby operation of the hydraulic motor in a second direction of rotation opposite to the first direction of rotation causes transfer of air from the tire to the reservoir.

9. A pressure regulation system of a tire comprising a rotary joint as defined in claim 3, in combination with a compressor installed on said non-rotating entity, and at least one interception valve for inlet and outlet flow from said tire, wherein the at least one fluid passage channel comprises a first passage channel and a second passage channel, wherein the first passage channel of said rotary joint puts in fluid communication said compressor with a fluid source line of said interception valve, through a first passage channel valve, and the second passage channel of said rotary joint puts in fluid communication said compressor with said tire, through a second passage channel valve and said interception valve.

10. The pressure regulation system of a tire according to claim 9, wherein said valve along said first passage channel is a two-way valve and said valve along said second passage channel is a three-way valve.

11. A pressure regulation system of a tire characterised in that it comprises a rotary joint as defined in claim 3, in combination with a hydraulic circuit of said non-rotating entity, a variable-volume chamber and control means of said chamber, apt to vary the volume of said chamber, said chamber being placed in a rim of said tire, being filled with air under pressure and being in fluid communication with said tire, through at least one interception valve; wherein the at least one fluid passage channel comprises a first passage channel and a second passage channel, wherein the first passage channel of said rotary joint puts in fluid communication said hydraulic circuit with a fluid source line of said interception valve, through a first passage channel valve, and the second passage channel of said rotary joint puts in fluid communication said hydraulic circuit with said control means of said chamber, through a second passage channel valve and said interception valve.

12. The pressure regulation system of a tire according to claim 11, wherein said control means comprise three or more hydraulic cylinders, said valve along said first passage channel is a two-way valve and that said valve along said second passage channel is a three-way valve.

13. A pressure regulation system of a tire comprising a rotary joint as defined in claim 3, in combination with a hydraulic circuit of said non-rotating entity, a reservoir, a compressor connected to a hydraulic motor, said reservoir, said compressor and said hydraulic motor being placed in a rim of said tire, said reservoir being filled with air under pressure and being in fluid communication with said tire, through said compressor and an interception valve;

wherein the at least one fluid passage channel comprises a first passage channel and a second passage channel;

wherein the first passage channel of said rotary joint puts in fluid communication said hydraulic circuit with said hydraulic motor, in correspondence of operating means of said hydraulic motor in a first direction of rotation, and with a fluid source line of said interception valve, through a first passage channel valve, whereby operation of the hydraulic motor in a first direction of rotation causes transfer of compressed air from the reservoir to the tire;

and the second passage channel of said rotary joint puts in fluid communication said hydraulic circuit with said hydraulic motor, and with a fluid source line of said interception valve, through the first passage channel valve or a second passage channel valve, whereby operation of the hydraulic motor in a second direction of rotation opposite to the first direction of rotation causes transfer of air from the tire to the reservoir.

\* \* \* \* \*